United States Patent [19]
McLean et al.

[11] Patent Number: 5,746,050
[45] Date of Patent: May 5, 1998

[54] GASEOUS PRODUCT DELIVERY SYSTEM

[75] Inventors: Christopher H. McLean, Seattle; Paul G. Lichon, Bothell; Joseph P. Morris, Bothell; Philip O. Flugstad, Bothell, all of Wash.

[73] Assignee: Primex Technologies, Inc., Redmond, Wash.

[21] Appl. No.: 588,697

[22] Filed: Jan. 19, 1996

[51] Int. Cl.⁶ .................................. F02C 3/30; F02K 9/42
[52] U.S. Cl. ............................ 60/200.1; 60/39.48; 60/259
[58] Field of Search ................................ 60/200.1, 39.48, 60/259

[56] References Cited

U.S. PATENT DOCUMENTS

| | | |
|---|---|---|
| 3,132,977 | 5/1964 | Knight . |
| 3,257,799 | 6/1966 | Goalwin . |
| 3,304,722 | 2/1967 | Culpepper . |
| 3,545,068 | 12/1970 | Bowles . |
| 3,672,165 | 6/1972 | Baum . |
| 3,677,011 | 7/1972 | Vickland . |
| 3,732,694 | 5/1973 | Blumenthal et al. . |
| 3,742,710 | 7/1973 | Trowbridge . |
| 3,757,520 | 9/1973 | Murfree, Jr. et al. . |
| 3,908,358 | 9/1975 | Sutton, Jr. . |
| 4,385,489 | 5/1983 | Abbott ................................ 60/39.48 |
| 4,490,972 | 1/1985 | Ellion et al. . |
| 4,517,798 | 5/1985 | Roberts . |
| 4,631,096 | 12/1986 | Sanger . |
| 4,867,195 | 9/1989 | Blewett et al. . |
| 5,117,627 | 6/1992 | Runavot . |
| 5,286,701 | 2/1994 | Mizukami et al. . |
| 5,464,961 | 11/1995 | Lichon . |
| 5,471,833 | 12/1995 | Pahl ................................ 60/39.48 |
| 5,481,869 | 1/1996 | Pahl . |

*Primary Examiner*—Charles G. Freay
*Attorney, Agent, or Firm*—Gregory S. Rosenblatt; Wiggin & Dana

[57] ABSTRACT

There is provided a system for the delivery of a gaseous product to a reaction chamber. The system includes a fuel tank containing a hypergolic liquid displaced from the fuel tank by a pressurized gas whose flow is controlled by a thruster control valve and directed to a gas generator. Pressurant gas entrained in the hypergolic liquid is not decomposed in the gas generator and causes pressure oscillations. The pressure oscillations are minimized by reducing the diameter of the gas bubbles or by disposing a gas fluid resistor between the gas generator and the reaction chamber.

10 Claims, 7 Drawing Sheets

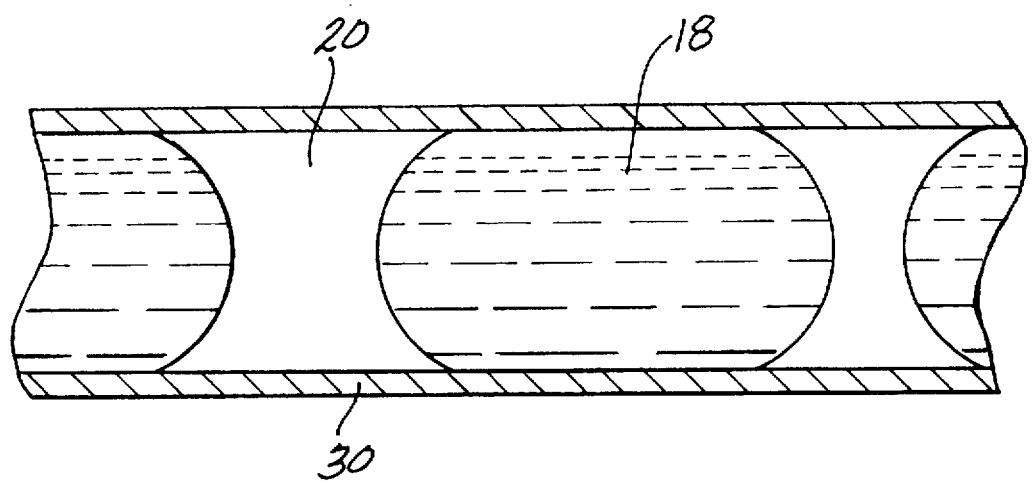
PRIOR ART  FIG-2
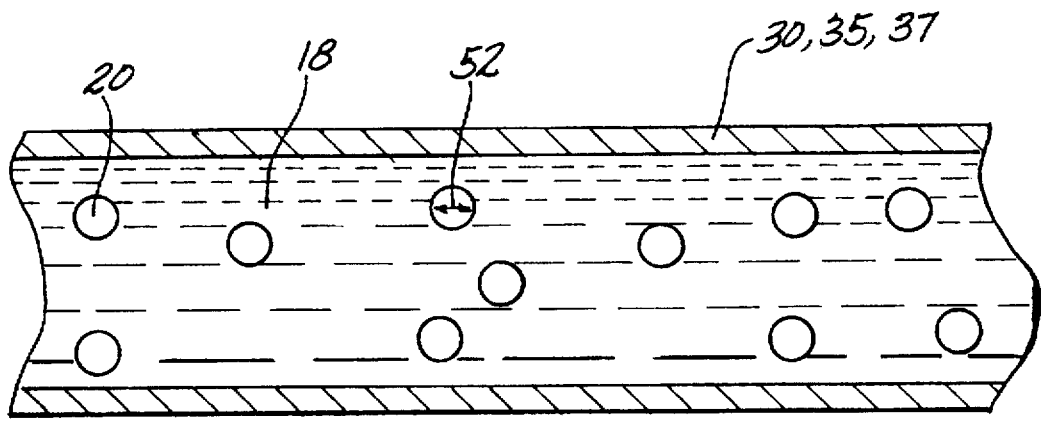
FIG-3

5,746,050

GASEOUS PRODUCT DELIVERY SYSTEM

BACKGROUND OF THE INVENTION

1. Field of the Invention

This invention relates to a system to deliver a gaseous product to a reaction chamber. More particularly, in combination with a gas generator that decomposes the liquid to a gaseous product, a mechanism is provided to minimize pressure fluctuations within the gas generator to produce a consistent flow of gaseous product.

2. Description of the Related Art

Applications requiring a catalytically decomposed liquid in a gas generator to a gaseous product include turbine engines and rocket engines. Typically, a hypergolic liquid is stored in a fuel tank. A pressurized gas is delivered to the fuel tank pressurizing the hypergolic liquid. A thrust control valve initiates or terminates flow of the hypergolic fluid to a gas generator.

The gas generator includes a catalyst to promote decomposition of the liquid to a gaseous product with the volume of gas generated being significantly greater than the volume of hypergolic liquid delivered to the gas generator. The gaseous product is then delivered to a reaction chamber, such as a rocket engine or a turbine, where the gaseous product is converted to useful work.

The use of a pressurized gas to deliver a liquid to a combustion chamber is disclosed in both U.S. Pat. No. 3,132,977 to Knight and U.S. patent application Ser. No. 08/431,079 entitled "Two Stage Pressurization System for Aerospace Applications" by Donald A. Pahl that was filed on Apr. 27, 1995. Both the Knight patent and the Pahl patent application are incorporated by reference in their entireties herein.

One hypergolic liquid employed for space craft propulsion is hydrazine ($N_2H_4$). Hydrazine decomposes to hydrogen gas and nitrogen gas on contact with an iridium catalyst in a gas generator. The hydrogen and nitrogen gases are converted to a high temperature plasma in an arcjet thruster and expelled at supersonic speeds through a nozzle propelling the space craft.

Pressurized helium gas is used to displace the liquid hydrazine from the fuel tank and helium bubbles may become entrained in the hydrazine liquid. In addition, the helium pressurant may go into solution in the hydrazine to be released as bubbles when the hydrazine experiences a pressure drop, such as that experienced across the fluid resistor. At the typical pressure employed in space craft propulsion systems, on the order of 80 psia to 100 psia, the helium bubbles can be large enough to cause the hydrazine to be delivered to the gas generator as liquid slugs separated by helium bubbles or as a liquid interspersed with a plurality of bubbles.

When the liquid hydrazine contacts the catalyst in the gas generator, it rapidly decomposes into a large volume of gas increasing the pressure in the gas generator. Helium does not react with the catalyst in the gas generator so that when a helium bubble passes through the gas generator, there is no increase in gas volume and the pressure in the gas generator drops.

Fluctuations in the gas generator between high pressure when hydrazine is present and low pressure when helium is present causes pressure and mass flow rate oscillations in the gaseous product output thereby reducing the efficiency of the reaction chamber. In an arcjet thruster, these pressure and mass flow rate oscillations may cause the electric arc to travel from the nozzle back into the throat generating the potential for the electric arc to either extinguish or erode the throat.

The operation of an arcjet thruster and conductive rails to drive the electric arc from the throat to the nozzle are disclosed in U.S. Pat. No. 5,464,961 entitled "Improved Arc Jet Anode" by Paul G. Lichon et al. that is incorporated by reference in its entirety herein.

To successfully integrate a system for the consistent delivery of a gaseous product to an arcjet thruster that employs a pressurized, hypergolic liquid fuel requires a mechanism to minimize or eliminate the pressure oscillations caused by gas bubbles entrained in the hypergolic liquid.

SUMMARY OF THE INVENTION

Accordingly, it is an object of the invention to provide a system for the delivery of a gaseous product that minimizes pressure and mass flow rate oscillations. It is a feature of the invention that in one embodiment, a gas fluid resistor is disposed between a gas generator and a reaction chamber. In another embodiment, a gas bubble disrupter is positioned between the fuel tank and the gas generator.

Among the advantages of the invention are that a more consistent flow of gaseous product is delivered to the reaction chamber leading to more consistent operation. When the reaction chamber is an arcjet thruster, erosion of the arcjet throat by the electric arc backing into the throat is minimized.

In accordance with the invention, there is provided a system for the delivery of a gaseous product to a reaction chamber. The system includes a fuel tank that contains a hypergolic liquid. A cylinder containing a pressurized gas communicates with the fuel tank through a first conduit. A fluid resistor receives the hypergolic fluid from the fuel tank through a second conduit. This fluid resistor creates a pressure drop when the hypergolic fluid is flowing, tailoring the pressure response of the system. A thrust control valve receives the fluid though a third conduit and controls initiation and termination of the hypergolic fluid. A gas generator receives the hypergolic liquid from the thruster control valve through a fourth conduit and delivers a gaseous product to a reaction chamber through a fifth conduit.

In one embodiment, a gas bubble disrupter is disposed between the fuel tank and the gas generator to ensure that gas bubbles in the second conduit have a diameter less than the inside diameter of the second conduit.

In a second embodiment, a gas fluid resistor is disposed between the gas generator and the reaction chamber.

BRIEF DESCRIPTION OF THE DRAWINGS

FIG. 2 shows in cross-sectional representation liquid slugs separated by gas bubbles.

FIG. 3 shows in cross-sectional representation small gas bubbles uniformly dispersed in a liquid.

The above stated objects, features and advantages will become more apparent from the specification and drawings that follow.

DETAILED DESCRIPTION

Figure 1:
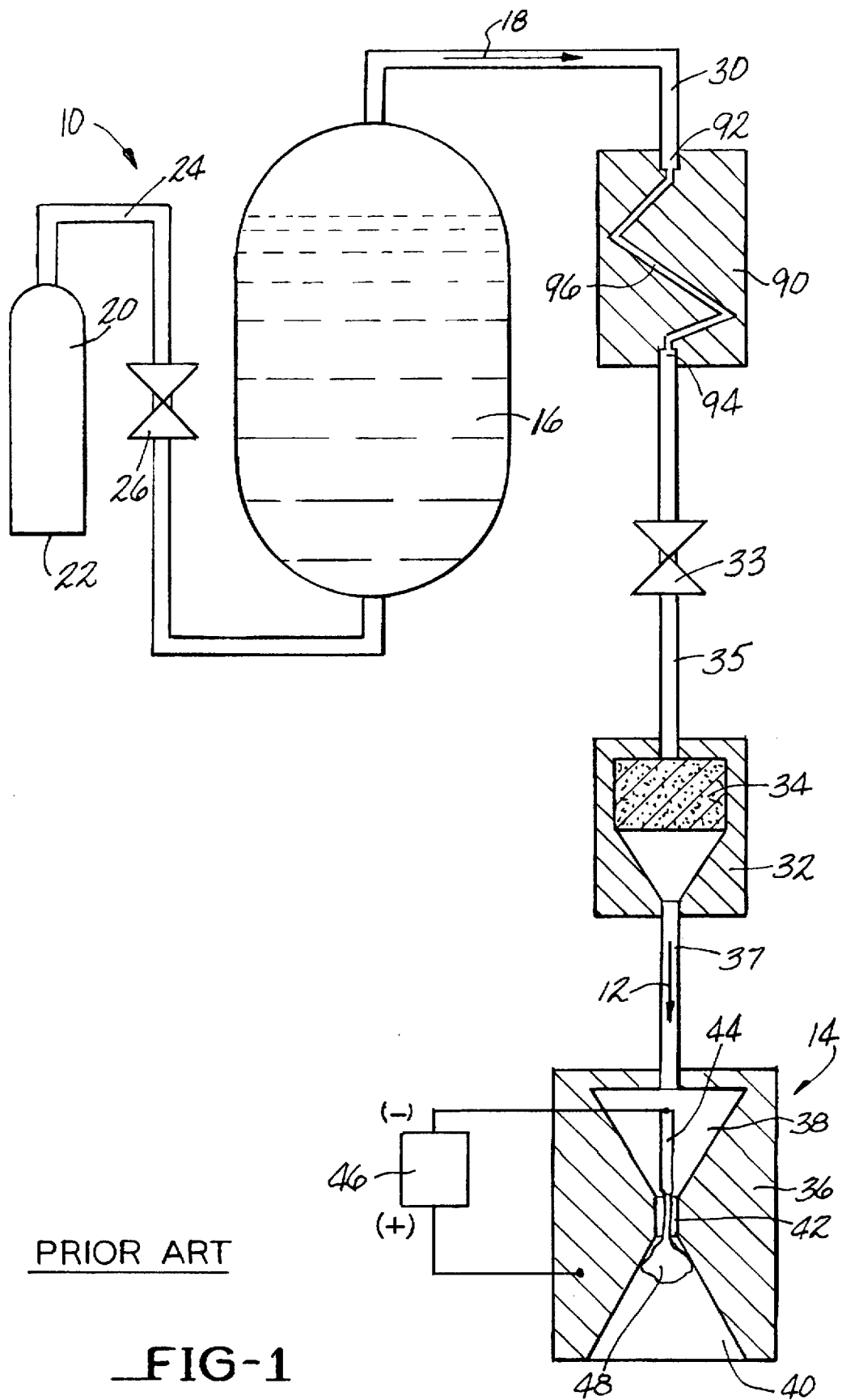
FIG. 1 shows in block diagram a system for the delivery of a gaseous product to an arcjet thruster as known from the prior art.

FIG. 1 shows in block diagram a system 10 for the delivery of a gaseous product 12 to a reaction chamber 14 as known from the prior art. The system 10 has a fuel tank 16 that contains a hypergolic liquid 18. The hypergolic liquid is preferably a hypergolic monopropellant such as hydrazine.

A pressurized gas 20 housed in a pressure vessel 22 communicates with the fuel tank 16 through a first conduit 24. The pressurized gas is any suitable gas that is essentially non-reactive with the conduits and with the hypergolic liquid 18. When the hypergolic liquid 18 is hydrazine, helium is preferred as the pressurized gas 20.

The conduits are formed from any material having chemical resistance to the hypergolic liquid 18, having thermal resistance to temperatures generated by a gas generator (up to 1300° F.) and capable of withstanding the system operating pressure of up to 400 psia. Stainless steels such as Type 304L stainless steel (nominal composition, by weight, 18%–20% chromium, 8%–12% nickel and the balance iron) and high performance alloys such as Inconel 600 (nominal composition, by weight, 76% nickel, 15.5% chromium, 8% iron and 0.5% manganese) are suitable materials for the conduits.

Opening a first valve 26 disposed in the first conduit 24 by any suitable means such as mechanical, electromechanical or pyrotechnic causes the pressurized gas 20 to flow through the first conduit 24 and pressurize the hypergolic liquid 18.

A portion of the pressurized gas 20 may be entrained in, or absorbed by, the hypergolic liquid 18. Referring to FIG. 2, the result is slugs of displaced hypergolic liquid 18 separated by the entrained bubbles of the pressurized gas 20. The bubbles can be quite large and have a diameter that may exceed many times the inside diameter of a second conduit 30.

With reference back to FIG. 1, the second conduit 30 joins the fuel tank 16 to a thrust control valve 33. A liquid fluid resistor 90 is interposed into the second conduit 30. The liquid fluid resistor 90 produces a uniform pressure drop from the inlet 92 to the outlet 94 and also minimizes the effect of back flow pressure surges from the outlet 94 to the inlet 92.

One type of liquid fluid resistor 90 includes a reduced diameter portion 96 with many twists and turns to change the direction of liquid flow many times as the hypergolic liquid 18 traverses the liquid fluid resistor 90.

The pressure of the hypergolic liquid 18 in the outlet 94 is determined by the reduced diameter and the flow geometry. This pressure is less than the pressure of the hypergolic liquid 18 at the inlet 92. The result is a uniform, pressure drop regulated flow of hypergolic liquid 18 to a gas generator 32.

The pressure drop across the fluid resistor 90 can result in the generation of pressurant bubbles (20 in FIG. 2) if the pressurized hypergolic fluid 18 has absorbed the pressurant gas 20. Bubble generation is due to the pressure drop of the pressurized hypergolic fluid 18 from the fluid resistor inlet at 92 to the fluid resistor outlet 94. This decrease in pressure changes the saturation point of the hypergolic fluid 18, releasing the pressurant gas 20 from solution into the hypergolic fluid 18 flowing in the fluid resistor outlet 94.

The thrust control valve 33 controls initiation and termination of flow of the pressurized hypergolic liquid 18 to the gas generator 32 via a third conduit 35. When the thrust control valve 33 initiates flow, the pressurized hypergolic liquid 18 flows through the third conduit 35 to the gas generator 32. The gas generator 32 contains a porous catalyst bed 34 of any suitable material that catalyzes the decomposition of the hypergolic liquid. When the hypergolic liquid is hydrazine, one suitable catalyst is iridium deposited on a porous alumina substrate.

The pressurized hypergolic liquid 18 is decomposed to a gaseous product 12. For hydrazine, the gaseous product is a mixture of hydrogen gas and nitrogen gas. The decomposition of the hypergolic liquid 18 to the gaseous product 12 results in a rapid volumetric expansion, accelerating the gaseous product 12 to the reaction chamber 14 through a fourth conduit 37.

The reaction chamber 14 may comprise any suitable device such as a turbine generator or an arcjet thruster. FIG. 1 illustrates an arcjet thruster. The arcjet thruster includes an anode body 36 usually manufactured from tungsten or a tungsten alloy. The anode body 36 is disposed about a central cavity having an upstream converging portion 38 and a diverging downstream portion 40. Disposed between the converging upstream portion 38 and diverging downstream portion 40 is a reduced diameter throat 42.

A cathode 44 disposed in the upstream converging portion 38 approaches the throat 42. When voltage is applied through power controller 46, an electric arc 48 bridges the cathode and the upstream converging portion 38. The force of the gaseous product 12 traversing the arcjet thruster 14 forces the electric arc 48 through the throat 42. In steady state operation, the electric arc attaches to a wall of the downstream diverging portion 40. The heat generated by the electric arc 48 heats the gaseous product to a temperature of about 30,000° C., generating a plasma. Expulsion of the hot plasma through the diverging portion 40 propels a space craft.

When a pressurant gas bubble 20 entrained in the hypergolic liquid contacts the catalyst bed 34, the pressurant gas is not decomposed and there is no increase in volume. The pressure in the gas generator 32 rapidly decreases, reducing the rate of flow of the gaseous product 12 to the reaction chamber 14. This effect is detrimental in many different ways:

- Pressure oscillations within the gas generator 32 may damage the gas generator or the catalyst bed.
- As the flow rate of the gaseous product 12 to reaction chamber 14 decreases, the electric arc 48 moves back through the throat 42 toward the converging portion 38. The movement of the electric arc through the throat 42 causes erosive wear of the throat, changing the characteristics of the arcjet thruster.
- A sufficient drop in the supply of gaseous product 12 to the reaction chamber 14 may cause the electric arc 48 to extinguish.

In accordance with a first embodiment of the invention, pressure oscillations in the gas generator are minimized by reducing the size of the bubbles of pressurized gas in the pressurized hypergolic liquid 18. As illustrated in FIG. 3, The maximum diameter 52 of pressurant bubbles 20 is controlled to be less than the inside diameter of the conduits 30,35,37 downstream of the fuel tank 16. Preferably, the maximum diameter 52 is from about 5% to about 35% of the inside diameter of these conduits 30,35,27 and most preferably from about 10% to about 20% of the inside diameter.

Figure 4:
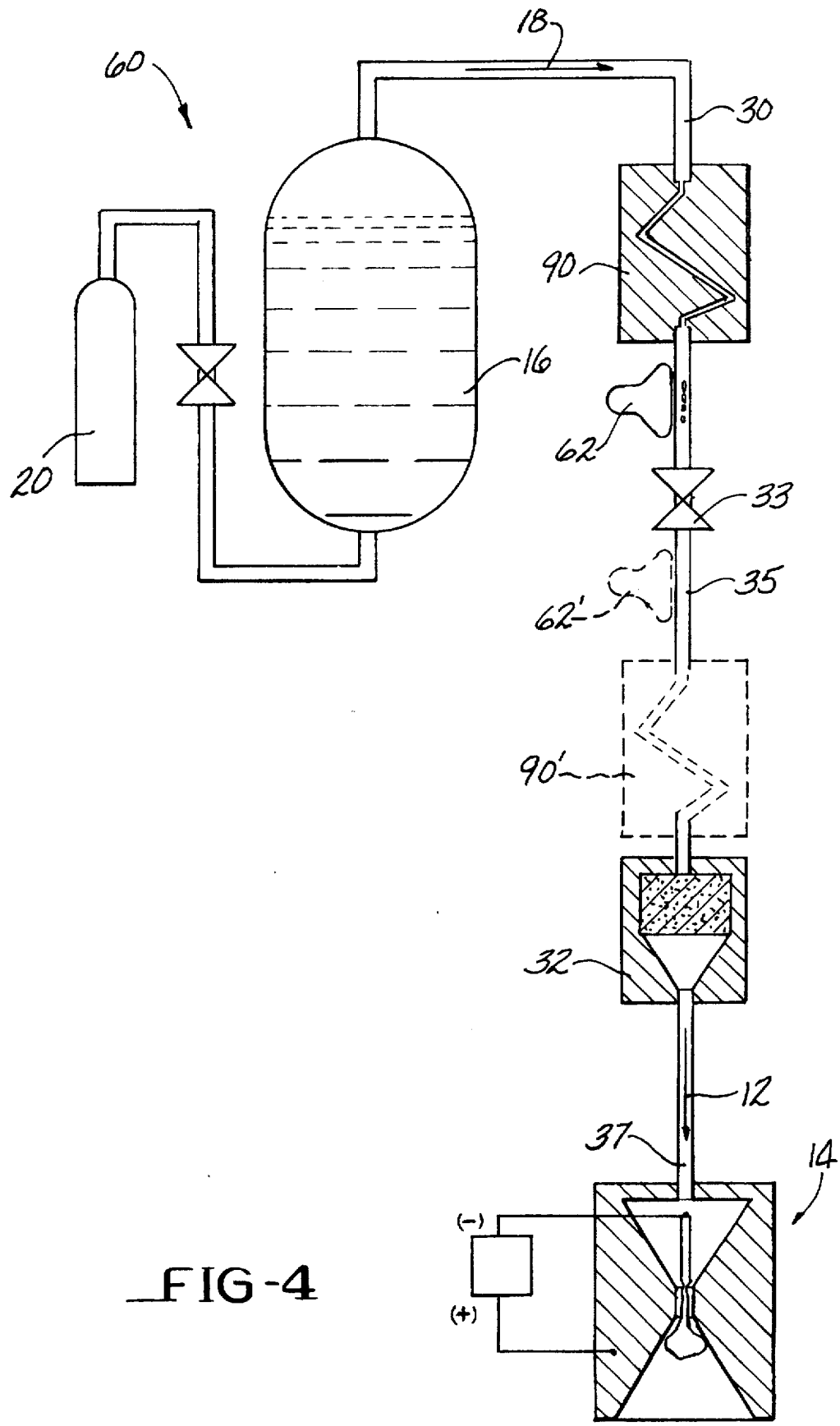
FIG. 4 shows in block diagram a system for the delivery of a gaseous product to a reaction chamber that includes a bubble disrupter in accordance with the invention.

FIG. 4 illustrates in block diagram a system 60 for the delivery of a gaseous product to a reaction chamber that produces bubbles of the type illustrated in FIG. 3. Most of the components of FIG. 4 are similar to those illustrated in FIG. 1 and a full description of these components is not required. Components identified by like numerals perform similar functions.

Disposed between the fluid resistor 90 and the thrust control valve 33 in communication with the third conduit 35 is a gas bubble disrupter 62. The gas bubble disrupter 62 may, alternatively, be disposed between the thrust control valve 33 and the gas generator 32 as illustrated by broken line alternative embodiment 90' in FIG. 4. The gas bubble disrupter 62 is any apparatus effective to reduce the size of gas bubbles entrained in the displaced hypergolic liquid 18 such that the diameter of the bubbles is much less than the inside diameter of downstream conduits 30,35,37. Suitable bubble disrupters include an ultrasonic transducer and an externally driven flow agitator.

Figure 5:
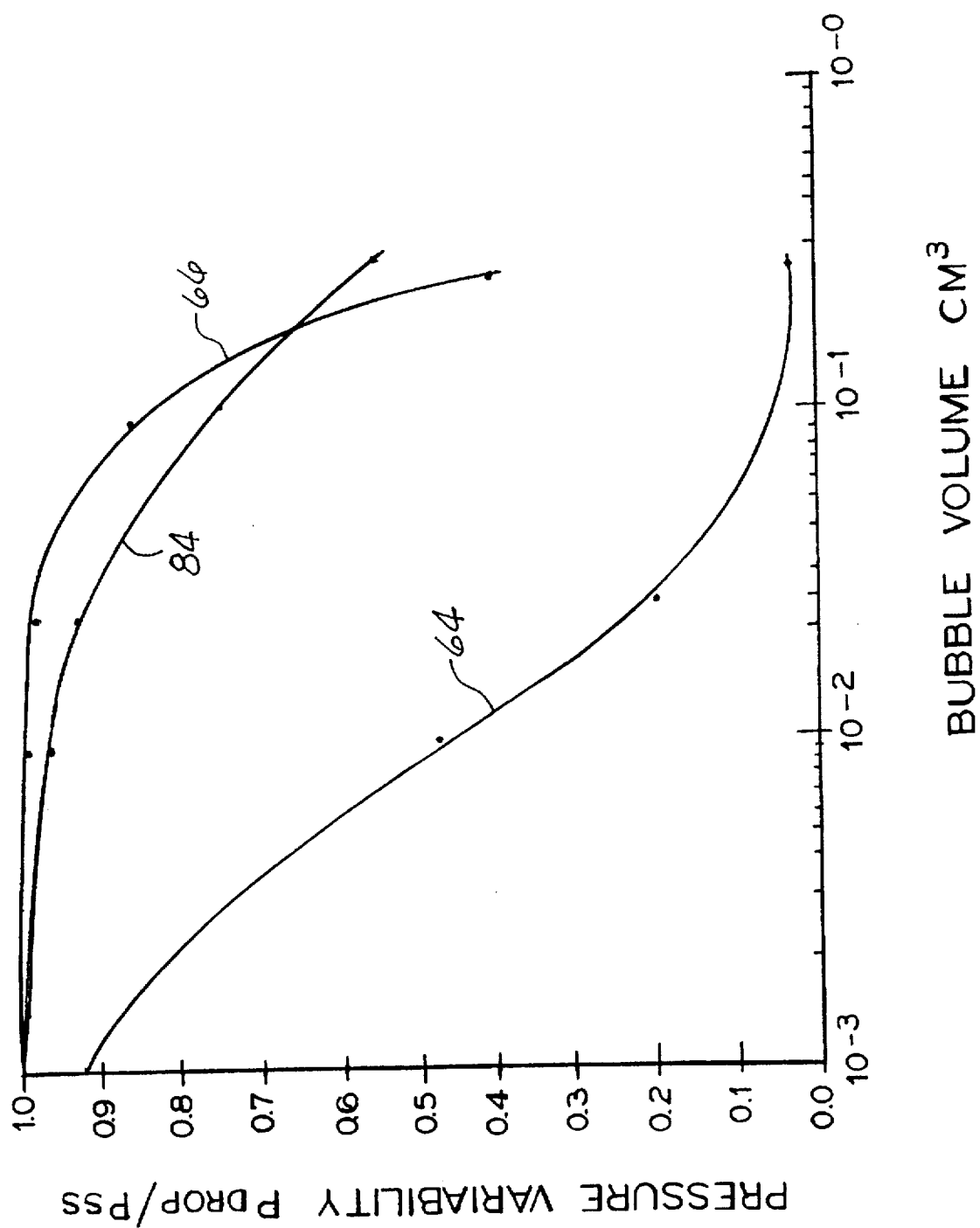
FIG. 5 graphically illustrates the relationship between gas bubble volume and pressure variation at the throat of an arcjet thruster.

The benefits of this embodiment of the invention are graphically illustrated in FIG. 5. FIG. 5 illustrates the calculated pressure drop at the throat of an arcjet thruster when the source gas for that arcjet thruster is disrupted by an inert gas bubble displacing hypergolic liquid in the gas generator.

For the FIG. 5 calculations, the pressure of the hypergolic liquid was 255 psia and the power of the arcjet thruster was 1600 watts. Pressure variability is recorded on the ordinate as the ratio of the reduced pressure ($P_{drop}$) to the steady state pressure ($P_{ss}$). The closer this ratio is to 1.0, the less the pressure drop and the more effective the gas delivery system. The bubble volume is recorded on the abscissa.

By comparing reference line 64 for conventional flow with slugs of liquid interspersed with gas bubbles having a diameter greater than the inside diameter of the third conduit 35 and reference line 66 for flow with smaller diameter bubbles having a diameter much less than the inside diameter of the third conduit 35, the improvement in delivery of gaseous product to the reaction chamber is apparent.

Alternatively, in a second embodiment of the invention, smaller bubbles result from increasing the operating pressures in the system. This approach has the additional benefit of reducing the hydrazine boiling point. At a conventional gas generator operating pressure of 80–100 psia, the boiling temperature of hydrazine is about 350° F. At a gas generator pressure of 200–400 psia, the boiling temperature of hydrazine is about 470° F.

Figure 6:
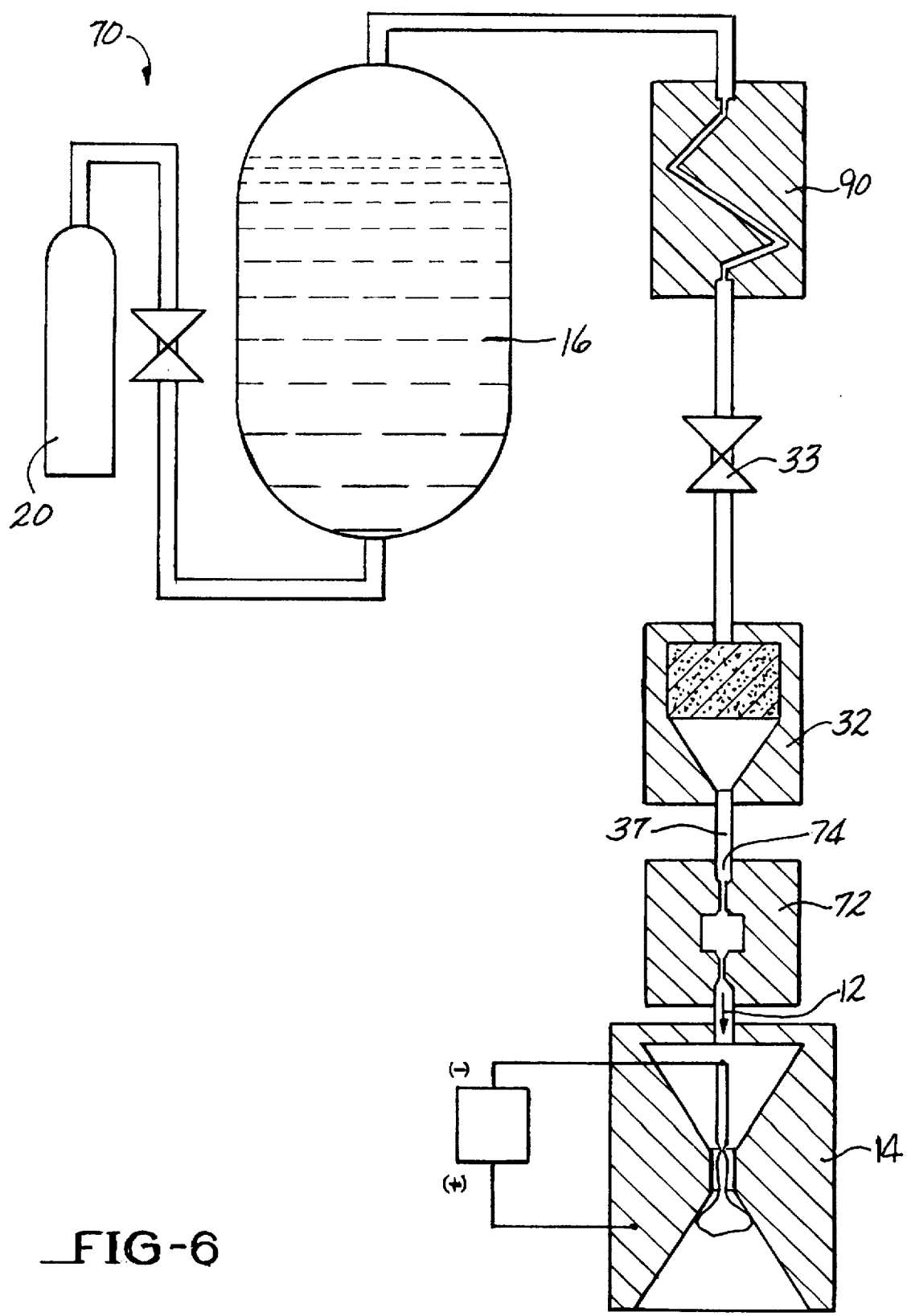
FIG. 6 illustrates in block diagram a system for the delivery of a gaseous product to a reaction chamber including a gas fluid resistor in accordance with the invention.

FIG. 6 illustrates in block diagram a system 70 for the delivery of a gaseous product 12 to a reaction chamber 14 as described in a third embodiment. Many components of system 70 are similar to the components illustrated in FIGS. 1 and 4 and are identified by like reference numerals.

Figure 7:
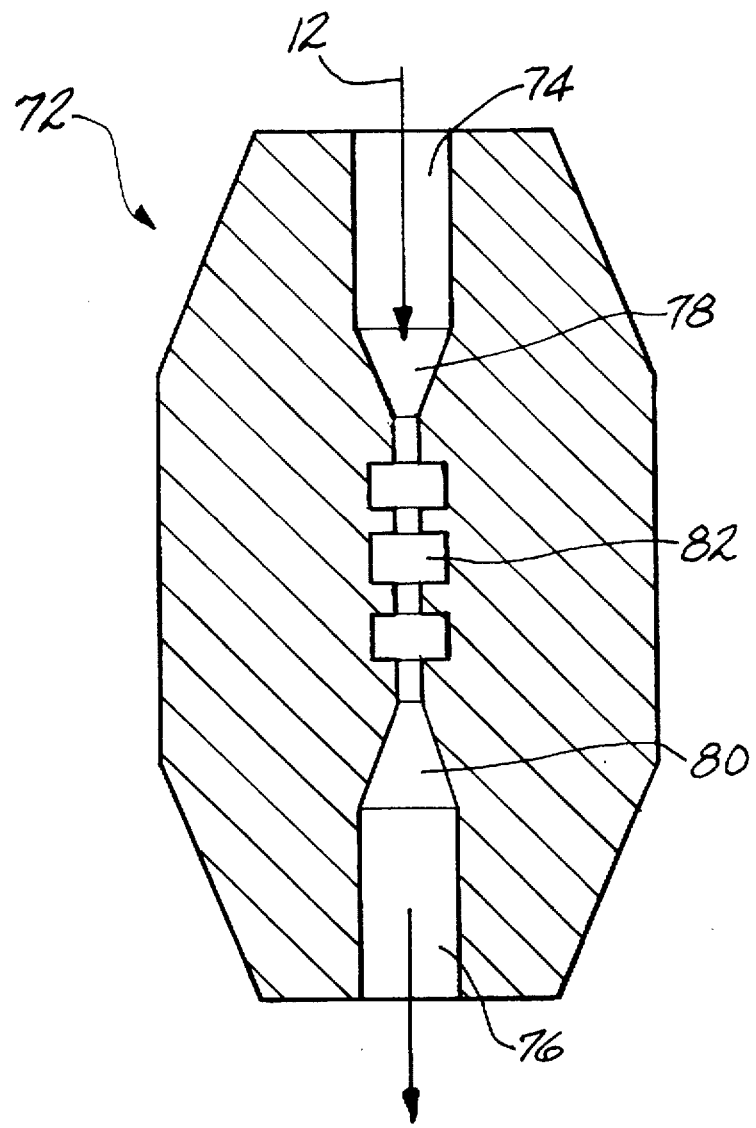
FIG. 7 illustrates in cross-sectional representation a gas fluid resistor.

Disposed between the gas generator 32 and the reaction chamber 14 is a gas fluid resistor 72 that is illustrated in greater detail in FIG. 7. An inlet tube 74 of the gas fluid resistor is connected to the fourth conduit 37 between the gas generator 32 and the reaction chamber 14. The gas fluid resistor has an inlet tube 74 and an outlet tube 76. Both the inlet tube 74 and outlet tube 76 have a diameter about equal to the inside diameter of the fourth conduit 37. The inlet tube 74 terminates upstream of the flow restriction 82. The pressure drop from the inlet 74 to the outlet 76 is from about 1.5:1 to about 5:1 and preferably from about 2:1 to about 4:1.

Since the pressure of the gas in the outlet tube 76 is primarily dependent on the flow restriction 82, pressure fluctuations of the gaseous product 12 upstream, at the gas generator and at the inlet tube 74, have a minimized effect on the downstream pressure at the outlet tube 76 and at the reaction chamber. The reaction chamber receives a more consistent flow of gaseous product 12 and consistent operation is achieved.

With reference back to FIG. 5, reference line 84 illustrates the calculated pressure variability in the reaction chamber, utilizing the system 70 illustrated in FIG. 6. There is minimum pressure variability up to a bubble volume of approximately $2\times 10^{-2}$ cm$^3$, a significant improvement over the conventional system identified by reference line 64.

Figure 8:
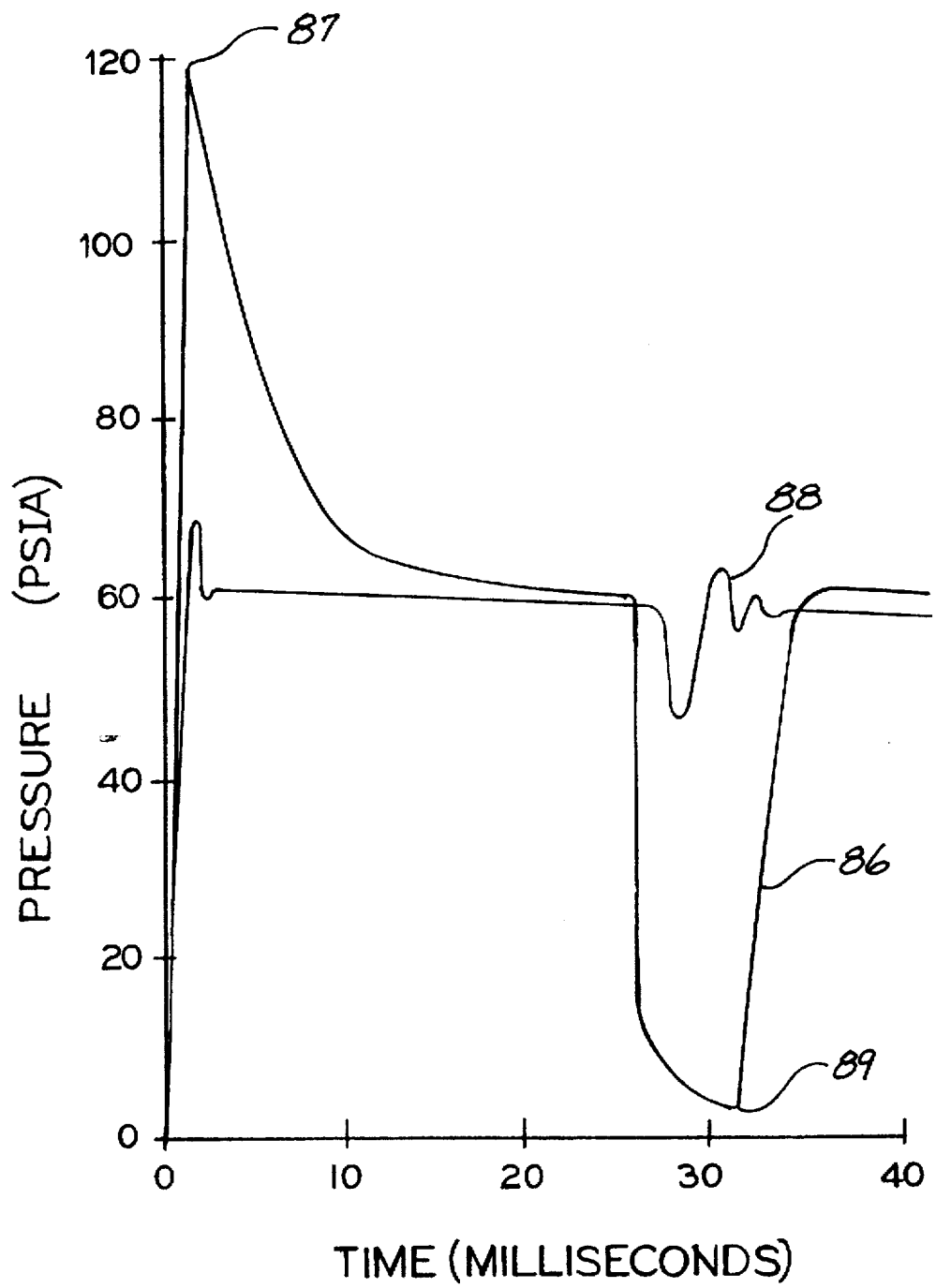
FIG. 8 graphically illustrate pressure fluctuations in a gas generator for different delivery systems.

FIG. 8 illustrates the pressure fluctuations through the gas generator throat of decomposed gaseous products as a 0.075 cm$^3$ bubble entrained in a flowing hypergolic liquid at a pressure of 255 psia flows through the gas generator. The pressure (reference line 86) for the prior art system 10 varies by almost 120 psia in a time of less than 40 milliseconds. The pressure 86 is varied by a surge 87 induced by a bubble expansion or evolution due to a pressure drop across the fluid resistor 72. This bubble expansion increases the volume of hypergolic liquid displaced into the gas generator. A pressure nadir 89 occurs when the inert gas bubble occupies the gas generator displacing hypergolic liquid.

The pressure (reference line 88) for the system 70 shows the pressure fluctuation reduced to approximately 15 psia over the same 40 millisecond time frame with damped periodic pressure oscillations occurring at about 30 milliseconds.

It is apparent that there has been provided in accordance with the present invention a system to deliver a gaseous product to a reaction chamber that fully satisfies the objects, means and advantages set forth herein above. While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A system for the delivery of a gaseous product to a reaction chamber, comprising:

a fuel tank containing a hypergolic liquid;

a cylinder containing a pressurized gas communicating with said fuel tank through a first conduit;

a fluid resistor controlling the hypergolic fluid pressure drop of the system disposed between said fuel tank and said reaction chamber in communication with a second conduit;

a thrust control valve disposed between said fuel tank and said reaction chamber;

a gas generator receiving said hypergolic liquid from said thrust control valve through a third conduit and delivering a gaseous product to said reaction chamber through a fourth conduit; and a bubble disrupter disposed upstream of said gas generator whereby bubbles of said pressurized gas entrained in said hypergolic liquid have a diameter less than the inside diameter of said third conduit.

2. The system of claim 1 wherein the diameter of said bubbles is from about 5% to about 35% of the inside diameter of said second conduit.

3. The system of claim 2 wherein said bubble disrupter is selected from the group consisting of ultrasonic transducers and externally driven flow agitators.

4. The system of claim 3 wherein said hypergolic liquid is hydrazine, said pressurized gas is helium and said reaction chamber is an arcjet thruster.

5. The system of claim 2 wherein said fluid resistor is upstream of said thrust control valve.

6. The system of claim 2 wherein said fluid resistor is downstream of said thrust control valve.

7. A system for the delivery of a gaseous product to a reaction chamber, comprising:

a fuel tank containing a hypergolic liquid;

a cylinder containing a pressurized gas communicating with said fluid tank through a first conduit;

a fluid resistor controlling the hypergolic fluid pressure drop of the system disposed between said fuel tank and said reaction chamber in communication with a second conduit;

a thrust control valve disposed between said fuel tank and said reaction chamber;

a gas generator receiving said hypergolic liquid from said thrust control valve through a third conduit and delivering a gaseous product to said reaction chamber through a fourth conduit; and a gas fluid resistor in communication with said fourth conduit and disposed between said gas generator and said reaction chamber.

8. The system of claim 7 wherein the pressure drop across said gas fluid resistor is from about 1.5:1 to about 5:1.

9. The system of claim 8 wherein the pressure drop across said gas fluid resistor is from about 2:1 to about 4:1.

10. The system of claim 8 wherein said hypergolic liquid is hydrazine, said pressurized gas is helium and said reaction chamber is an arcjet thruster.

* * * * *